United States Patent
Neogy et al.

(10) Patent No.: US 10,095,537 B1
(45) Date of Patent: Oct. 9, 2018

(54) DRIVER VERSION IDENTIFICATION AND UPDATE SYSTEM

(71) Applicant: Amazon Technologies, Inc., Seattle, WA (US)

(72) Inventors: Amit Neogy, Bellevue, WA (US); Yisheng Lai, Seattle, WA (US); David Matthew Buches, Mercer Island, WA (US); Jonathan N. Scott, Snohomish, WA (US); Murtaza S. Ghiya, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 395 days.

(21) Appl. No.: 15/077,815

(22) Filed: Mar. 22, 2016

(51) Int. Cl.
*G06F 9/455* (2018.01)
*G06F 9/50* (2006.01)
*G06F 8/65* (2018.01)

(52) U.S. Cl.
CPC .......... *G06F 9/45558* (2013.01); *G06F 8/65* (2013.01); *G06F 9/5077* (2013.01); *G06F 2009/45579* (2013.01)

(58) Field of Classification Search
CPC .................................................. G06F 9/45558
See application file for complete search history.

(56) References Cited

U.S. PATENT DOCUMENTS

| | | | | |
|---|---|---|---|---|
| 8,396,807 B1* | 3/2013 | Yemini | .................. | G06Q 10/06 705/400 |
| 8,671,228 B1* | 3/2014 | Lok | ..................... | G06F 9/45558 710/15 |
| 2008/0250222 A1* | 10/2008 | Gokhale | ............. | G06F 9/45558 711/203 |
| 2015/0113532 A1* | 4/2015 | Huang | ................... | H04L 67/10 718/1 |
| 2015/0242227 A1* | 8/2015 | Nair | ........................ | G06F 21/60 718/1 |

* cited by examiner

Primary Examiner — Emerson Puente
Assistant Examiner — Steven Do
(74) Attorney, Agent, or Firm — Thorpe North & Western, LLP.

(57) ABSTRACT

A technology is described for a load time updatable driver. An example method may include presenting a driver interface to a computing instance launched in a computing service environment that enables the computing instance to interact with a virtualized resource, where the driver interface is an interface to driver functionality that enables the computing instance to interact with the virtualized resource via a hypervisor. Context information for the computing instance may be obtained and the context information may be used to identify a driver image for the virtualized resource that enables the computing instance to interact with the virtualized resource. The driver image for the virtualized resource may be obtained and the driver image may be loaded into computer memory and registered with the driver interface.

20 Claims, 8 Drawing Sheets

US 10,095,537 B1

DRIVER VERSION IDENTIFICATION AND UPDATE SYSTEM

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a physical server computer to be shared among multiple customers by providing each customer with one or more computing instances hosted by the physical server computer using a hypervisor or virtual machine manager. Each computing instance may be a guest machine acting as a distinct logical computing system that provides a customer with the perception that the customer is the sole operator and administrator of a given computing system.

Paravirtualization allows a computing instance to interact with virtualized hardware utilized by the computing instance (e.g., through making a call to the hypervisor). For example, paravirtualization may provide a computing instance with a software interface to a virtualized hardware device, such as a virtual network or virtual data store, which allows the computing instance to access the virtualized hardware device. A machine image used to launch a computing instance may include drivers for virtualized resources that are attached to the computing instance when the computing instance is launched. In launching the computing instance on a physical host using the machine image, a driver included in the machine image may be loaded on the computing instance and the computing instance may then access an associated virtualized resource available via the physical host.

DETAILED DESCRIPTION

Figure 1:
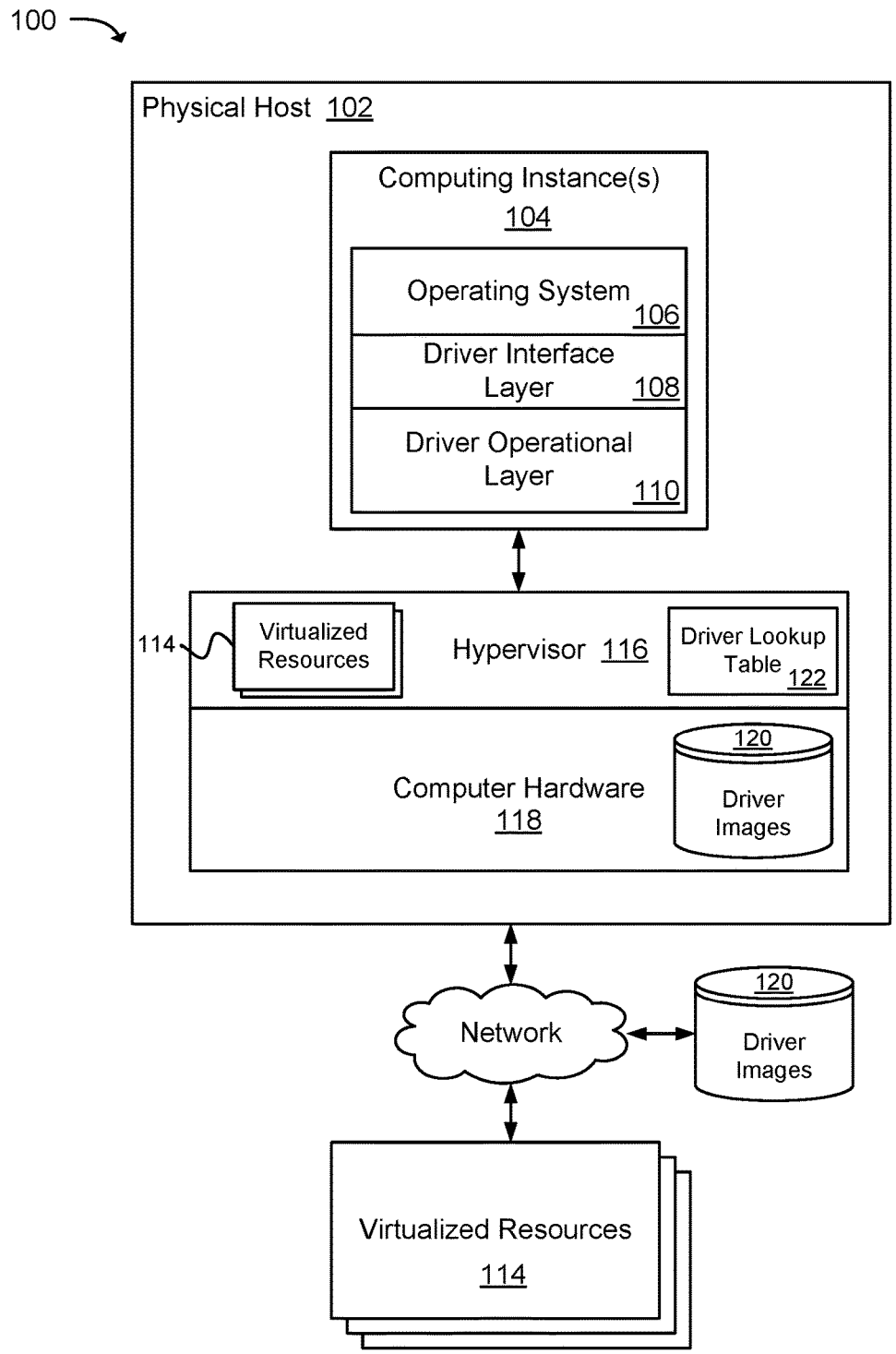
FIG. 1 is a block diagram illustrating an example system for identifying and loading updatable driver functionality on a computing instance launched on a physical host.

A technology is described for providing updatable driver functionality, for example paravirtual driver functionality, to a computing instance launched within a computing service environment. In one example of the technology, an operating system for a computing instance may be provided with a driver interface that provides the operating system access to updatable driver functionality. The driver functionality may be identified and loaded during initialization or launching of the computing instance on the hypervisor (or virtual machine manager). For example, a version of a driver image (e.g., a paravirtual driver) may be identified and loaded during initialization of a computing instance that provides driver functionality (e.g., paravirtual driver functionality) and allows the computing instance to utilize a virtualized resource, such as a network or storage resource. The driver identified may correspond to the specifications of the computing instance and the execution environment of the computing instance.

In one example, a machine image used to instantiate a computing instance may include a driver interface layer for a virtualized resource. This driver interface layer may be considered a thin layer driver because the driver interface layer may contain the interface to interact with the computing instance but may not include the operational layer or executable layer for the driver interface to actually perform driver operations. More specifically, the driver interface layer may be configured to provide the computing instance access to a driver operational layer. As a result, the driver interface layer may be configured to identify and load driver functionality (i.e., driver code or paravirtual driver code) that enables the computing instance to interact with the virtualized resource via a hypervisor. For example, during initialization of the computing instance's operating system, the driver interface may be loaded on the computing instance, and the driver interface layer may be configured to identify a driver image for the virtualized resource that corresponds to the computing instance and the execution environment of the computing instance. The driver interface may then load a current version of the driver operational layer from a designated storage location on the hypervisor, physical host or other networked data store. The driver may be loaded and registered with the driver interface, thereby allowing the computing instance to interact with the virtualized resource via the hypervisor.

In the past, drivers have been included in a machine image used to launch a computing instance. The practice of including drivers in a machine image has resulted in problems with the machine image containing outdated version of drivers and/or driver compatibility problems associated with moving a computing instance from one physical host to another physical host that may not be compatible with a particular driver. As a result of the current technology, automatic detection of a version of a driver can be performed as part of launching a computing instance, such that a driver image may be obtained and loaded during the launch of a computing instance. Namely, a driver interface layer may be configured to provide a computing instance an interface with load time updatable driver functionality by way of a driver operational layer configured to identify and load a driver image that may be specific to the computing instance and the physical host hosting the computing instance.

FIG. 1 is a diagram illustrating a high level example of a system 100 for identifying and loading updatable driver functionality on a computing instance 104 launched on a physical host 102. As illustrated, the system 100 may include a physical host 102 configured to host computing instances 104. A computing instance 104 may be a virtual computer executing on a physical host 102 by way of a hypervisor 116, virtual machine monitor (VMM), or another type of program configured to enable the execution of multiple computing instances 104 on the physical host 102. A hypervisor 116 may present computing instances 104 with a virtual hardware platform that provides the computing instances 104 access to virtualized resources 114 and the physical host's computer hardware 118 via a driver interface layer 108 and a driver operational layer 110. The driver interface layer 108 may provide an interface for a virtualized resource 114 (e.g., virtualized network hardware or virtualized storage hardware) to a computing instance 104, and the driver operational layer 110 may provide driver functionality.

A driver of the computing instance 104 launched on the physical host 102 may include the driver interface layer 110 configured to communicate with an operating system 106 and a driver operational layer 110. The interface layer 110 may provide interface definitions (e.g., function call or API call definitions) to enable the operating system 106 to access the driver functionality. The driver interface layer 108 may have static interface definitions and may act as an intermediary between the operating system 106 and the driver operational layer 110 that provides the driver functionality. In one example, the driver interface layer 108 may be configured to identify in a driver lookup table 122 a version of a driver image 120 that corresponds to a computing instance 104 implementation launched on the physical host 102 and load the driver image 120 into the driver operational layer 110 for use by the computing instance 104. The driver lookup table 122 may specify a current version of the driver image 120 that is configured for the computing instance implementation. For example, the driver image 120 may include the most recent updates to the driver code that are related to the operating system 106 of the computing instance 104, the hypervisor 116, and/or the physical host 102.

In another example, the hypervisor 116 may be configured to identify and load a version of a driver image 120 that corresponds to a computing instance 104 implementation in the driver operational layer 110. Consequently, the functionality of a traditional driver may be separated into the driver interface layer 108 and the driver operational layer 110, where the driver interface layer 108 is an interface to the driver operational layer 110 that provides driver core functionality (program instructions) that establishes communication between a computing instance 104 and a virtualized resource 114. By separating the functionality of a driver as just described, driver core functionality used to establish communication between a computing instance 104 and a virtualized resource 114 can be interchanged using a driver image 120 that corresponds to a computing instance implementation, hypervisor type or version number, and/or physical host 102 type.

In one example, during initialization of an operating system 106 on a computing instance 104, virtualized resources 114 accessible to the computing instance 104 through the hypervisor 116 and available for access by the computing instance 104 may be presented by the hypervisor 116 to the computing instance 104. For example, virtualized network resources and virtualized storage resources, such as a block storage service acting as a hard drive, may be presented to the computing instance 104. In response to being presented with the virtualized resources 114 accessible to the computing instance 104, the operating system 106 may load a driver interface layer 108 for a particular type of virtualized resource 114 utilized by the computing instance 104. The types of virtualized resources 114 may include virtualized networking, virtualized storage, etc. The driver interface layer 108 may allow the computing instance 104 to interface with a driver operational layer 110 associated with the particular virtualized resource 114. The driver operational layer 110 executes a driver image 120 associated with the particular virtualized resource 114.

After loading the driver interface layer 108, a driver image 120 providing an updated driver operation layer with core functionality used to establish communication between the computing instance 104 and the virtualized resource 114 may be identified in a driver lookup table 122. Various versions of driver images 120 for a virtualized resource 114 may be available for use by the computing instance 104. For example, different versions of a driver image 120 may be associated with specific implementations of a computing instance 104 on various physical hosts 102 (e.g., different operating system 106 versions, hypervisor versions, and/or different physical host 102 specifications), and/or different driver images 120 may be associated with upgrades, patches, error fixes, and the like. Accordingly, implementing a computing instance 104 on a first physical host may result in identifying and loading one version of a driver 120, and implementing the same computing instance 104 on a second physical host may result in identifying and loading a different version of a driver image 120.

In one example, the driver interface layer 108 may be configured to use a virtualized resource identifier (ID) for a virtualized resource 114 and context information for the computing instance implementation to identify a version of a driver image 120 that corresponds with the implementation of the computing instance 104 on the physical host 102. In another example, the hypervisor 116 may be configured to identify the driver image 120 using the virtualized resource identifier for the virtualized resource 114 and the context information for the computing instance implementation. Alternatively, an independent identification service that is accessible using networked API requests may be used to identify the driver image 120 using the virtualized resource identifier for the virtualized resource 114 and the context information for the computing instance implementation As indicated, context information for a computing instance implementation may be used to identify a driver image 120. The context information may include computing instance specifications (e.g., an operating system 106 type and version) and physical host 102 specifications (e.g., computer hardware 118 specifications and hypervisor 116 type and version). The context information for the computing instance implementation may be used along with a virtualized resource identifier for a virtualized resource 114 to identify a version of a driver image 120 to load for the computing instance implementation. As a specific example, the hypervisor 116 may receive a virtualized resource identifier for a virtualized network interface (NIC) adapter from an initializing computing instance 104 along with a request to attach the virtualized NIC adapter to the computing instance 104. The hypervisor 116 may retrieve context information for the computing instance 104 that may include an operating system type and version and context information for the physical host 102 may include computer hardware 118 specifications. Using the context information for the computing instance 104 and the physical host 102, the hypervisor 116 may identify a driver image 120 that corresponds to the operating system type and version and the computer hardware 118 of the physical host 102. The driver image 120 may then be obtained from a cached location on the physical host 102 or from a centralized storage location in a computing service environment as described below in relation to FIG. 2.

After a driver image 120 for the computing instance implementation has been loaded into the driver operational layer 110, the driver image 120 may be registered with the driver interface layer 108 allowing the virtualized resource 114 to be mapped to the computing instance 104. The computing instance 104 may be notified that the virtualized resource 114 is ready for Input/Output (I/O) and thereafter, the computing instance 104 may interact with the virtualized resource 114 using a communication channel provided by the hypervisor 116.

Figure 2:
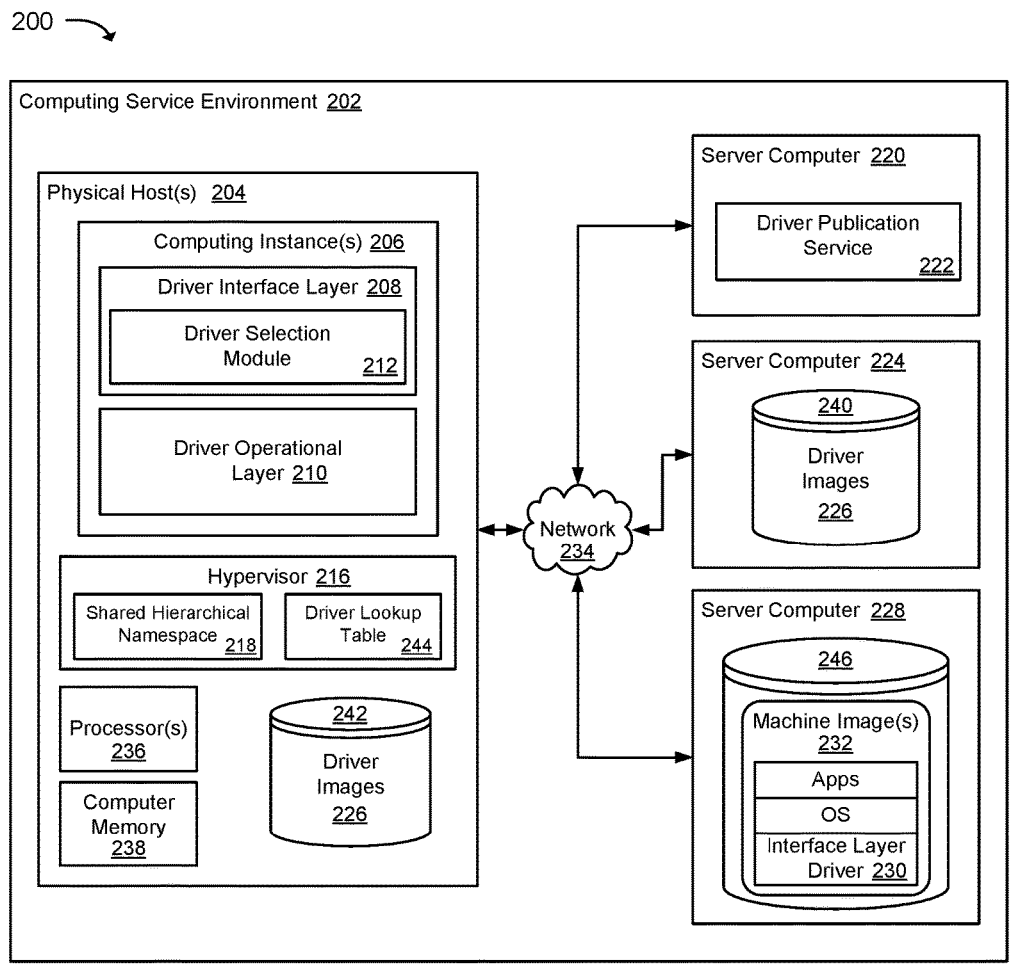
FIG. 2 is a block diagram that illustrates various example components included in a system for load time updatable driver functionality.

FIG. 2 illustrates components of an example system 200 on which the present technology may be executed. The system 200 may include a computing service environment 202 that contains a number of physical hosts 204 (e.g., thousands or even hundreds of thousands of servers) executing a number of computing instances 206 via a hypervisor 216. The physical host 204 may be in communication via a network 234 with a number of server computers 220, 224, and 228 included in the computing service environment 202.

A computing instance 206 launched on a physical host 204 may include a driver interface layer 208 configured to provide an interface to a driver operational layer 210 that provides load time updatable driver functionality. The driver interface layer 208 may be associated with a particular virtualized resource utilized by the computing instance 206. For example, a driver interface layer 208 may be associated with virtualized network hardware (e.g., a virtualized NIC adapter), virtualized storage hardware (e.g., virtualized block storage), or other type of virtualized resource. A computing instance 206 may include a separate driver interface layer 208 for each type of virtualized resource utilized by the computing instance 206. For example, a computing instance 206 may have a driver interface layer 208 for a virtualized NIC adapter and a driver interface layer 208 for virtualized block storage. During initialization of a computing instance 206, an interface layer driver 230 included in a machine image 232 used to launch the computing instance 206 may be loaded, providing the computing instance 206 with a driver interface layer 208 to a driver operational layer 210 associated with a virtualized resource. The driver interface layer 208 may also be loaded during the same time period as the interface layer driver 230 is loaded.

The driver operational layer 210 may be configured to execute load time updatable driver functionality that allows a computing instance 206 to access a virtualized resource via the driver interface layer 208. More specifically, the computing instance 206 may establish a communication channel with the virtualized resource through the driver interface layer 208 and the driver operational layer 210.

The driver interface layer 208 may, in one example, include a driver selection module 212 or logic to select an updateable operational layer of the driver to be loaded. The driver selection module 212 may be configured to identify a version of a driver image 226 that corresponds to a computing instance 206. A driver image 226 may provide driver functionality to a computing instance 206 via a driver interface layer 208 that enables the computing instance 206 to interact with a virtualized resource through the hypervisor 216.

In one example, context information for a computing instance 206 and/or a physical host 204 may be used to identify a version of a driver image 226. Context information may be obtained from a shared hierarchical namespace 218 (e.g., a hypervisor data store, XenStore, etc.) containing domain information for the computing instance 206 and may include context information for an operating system type and version, as well as other information associated with the computing instance 206. Context information for a physical host 204 may include a hypervisor type and version, as well as processor 236 and computer memory 238 specifications. The context information may be used to identify a driver image 226 configured to operate with one or more of the specifications included in the context information. For example, a driver image 226 configured for a specific operating system version of a computing instance 206 and processor type of a physical host 204 may be identified using the context information for the physical host 204 and the computing instance 206 executing on the physical host 204. In one example, a driver lookup table 244 may be used to identify a driver image 226 that corresponds to context information for a computing instance 206 and/or physical host 204. For example, the driver selection module 212 may be configured to query the driver lookup table 244 using context information to identify a driver image 226.

After identifying a driver image 226 for a computing instance implementation on a physical host 204, the driver image 226 may be obtained using the driver selection module 212 configured to locate and retrieve the driver image 226 from a storage location. For example, a driver image 226 may be retrieved from storage located on the physical host 204 or from a centralized storage location contained on a server 224 in the computing service environment 202. For example, driver images 226 may be stored on a cache 242 on a physical host 204 making the driver images 226 readily accessible to computing instances 206 that utilize the driver images 226. For example, those driver images 226 that are commonly utilized may be cached on the physical host 204. Older or seldom used driver images 226 may be stored on a centralized driver data store 240 within the computing service environment 202. In some examples, a prior version of a driver image cached on a physical host 204 may be replaced with a current driver image.

A driver image 226 obtained from a cache 242 on the physical host 204 or centralized driver data store 240 may be loaded on a computing instance 206 and the driver image 226 may be registered with the driver interface layer 208. The driver operational layer 210 may, in one example, provide driver functionality that allows the computing instance 206 to access a virtualized resource associated with the driver image 226. Having loaded the driver image 226, the computing instance's operating system may be notified that the virtualized resource is ready for Input/Output (I/O).

A machine image 232 used to instantiate a computing instance 206 on a physical host 204 may include a file system image having an operating system (e.g., Linux, UNIX, or Windows) and additional software used to deliver a service or a portion of it. The machine image 232 may further include one or more interface layer drivers 230 or thin interface drivers for virtualized hardware that when loaded as part of instantiating the computing instance 206 may provide the driver interface layer 208 described above. An interface layer driver 230 for a virtualized resource may replace a complete driver for the virtualized resource in the machine image 232. By including the interface layer driver 230 in the machine image 232 in place of a typical or complete driver, the relevant driver functionality may be loaded when instantiating a computing instance 206 using the machine image 232.

In some cases, a machine image 232 may include a driver (e.g., an obsolete driver) that may be eligible for replacement with an interface layer driver 230 that enables up-to-date driver functionality to be loaded when a computing instance 206 is launched using the machine image 232. In such cases, the machine image 232 may be analyzed at the time that a computing instance 206 is launched using the machine image 232 and the driver eligible for replacement may be removed from the machine image 232 and replaced with a corresponding interface layer driver 230.

In one example, a driver publication service 222 may be used to publish new driver images 226 for use by computing instances 206 launched on physical hosts 204. The driver publication service 222 may be configured to publish a driver image 226 to a centralized data store 240 containing driver images 226 that are accessible to physical hosts 204, and/or publish driver images 226 to the physical hosts 204 within the computing service environment 202. Driver lookup tables 244 located on the physical hosts 204 may be updated to include a driver images 226 published using the driver publication service 222.

The various processes and/or other functionality contained within the system 200 may be executed on one or more processors 236 that are in communication with computer memory 238. The system 200 may include a number of server computers that are arranged, for example, in one or more server banks or computer banks, or other arrangements. The server computers may support the computing service environment 202 using hypervisors 216, virtual machine monitors (VMMs), and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data stores 240, 242, and 246 may include storage systems such as a SAN (Storage Area Network), cloud storage network, volatile or non-volatile RAM, optical media, or hard-drive type media. The data stores 240, 242, and 246 may be representative of a plurality of data stores as can be appreciated.

The network 234 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system.

An API may be provided for each module to enable a second module to send requests to and receive output from the first module. API calls, procedure calls or other network commands that may be made in relation to the modules and services included in the computing service environment 202 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
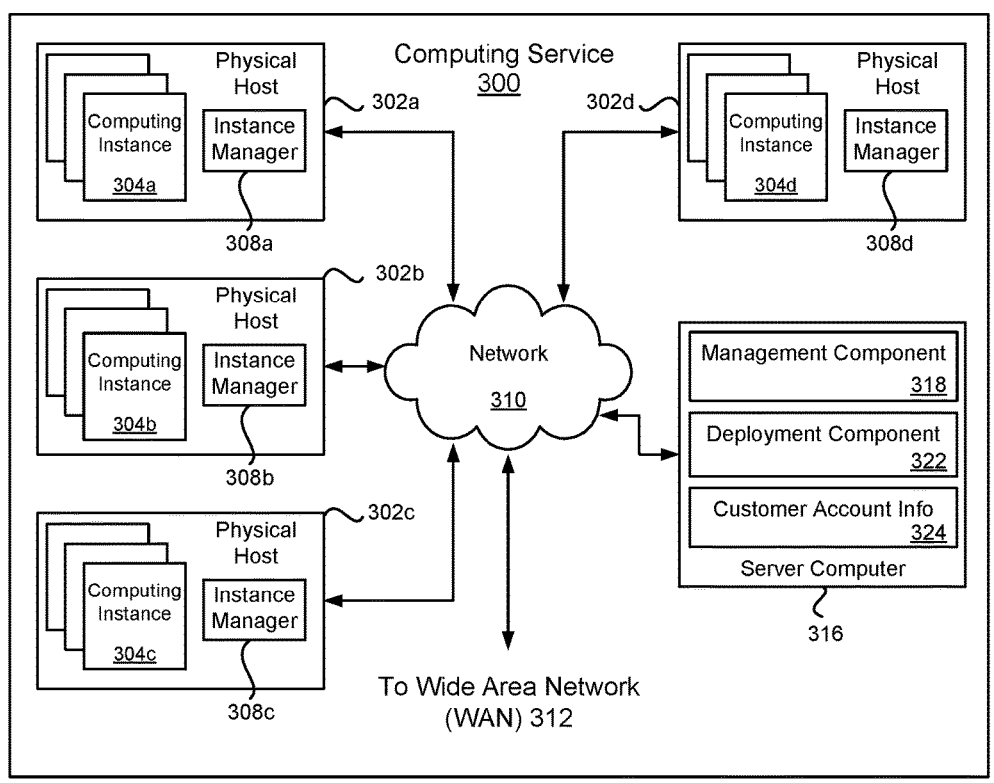
FIG. 3 is a block diagram that illustrates an example computing service environment that includes computing instances that utilize load time updatable driver functionality.

FIG. 3 is a block diagram illustrating an example computing service 300 that may be used to execute and manage a number of computing instances 304a-d. In particular, the computing service 300 depicted illustrates one environment in which the technology described herein may be used. The computing service 300 may be one type of environment that includes various virtualized service resources that may be used, for instance, to host computing instances 304a-d.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of server computers 302a-d. While four server computers are shown, any number may be used, and large data centers may include thousands of server computers. The computing service 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-d capable of executing the instances. The instance manager 308a-d may be a hypervisor, virtual machine monitor (VMM), or another type of program configured to enable the execution of multiple computing instances 304a-d on a single server. Additionally, each of the computing instances 304a-d may be configured to execute one or more applications.

One or more server computers 316 may be reserved to execute software components for managing the operation of the computing service 300 and the computing instances 304a-d. For example, a server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d.

A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304a-d may be configured. For example, the configuration may include an operating system, driver interface layer as described earlier, drivers, provide one or more applications to be installed in computing instances 304a-d, provide scripts and/or other types of code to be executed for configuring computing instances 304a-d, provide cache logic specifying how an application cache should be prepared, and other types of information. The deployment component 322 may utilize the customer-provided configuration and cache logic to configure, prime, and launch computing instances 304a-d. Launching a computing instance 304a-d may entail loading a driver interface layer and subsequently identifying and loading a driver image that is accessible to an operating system through the driver interface layer. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302a-d, 316. The network 310 may be a local area network (LAN) and may be connected to a Wide Area Network (WAN) 312 or the Internet, so that end customers may access the computing service 300. The network topology illustrated in FIG. 3 has been simplified, many more networks and networking devices may be utilized to interconnect the various computing systems disclosed herein.

Figure 4:
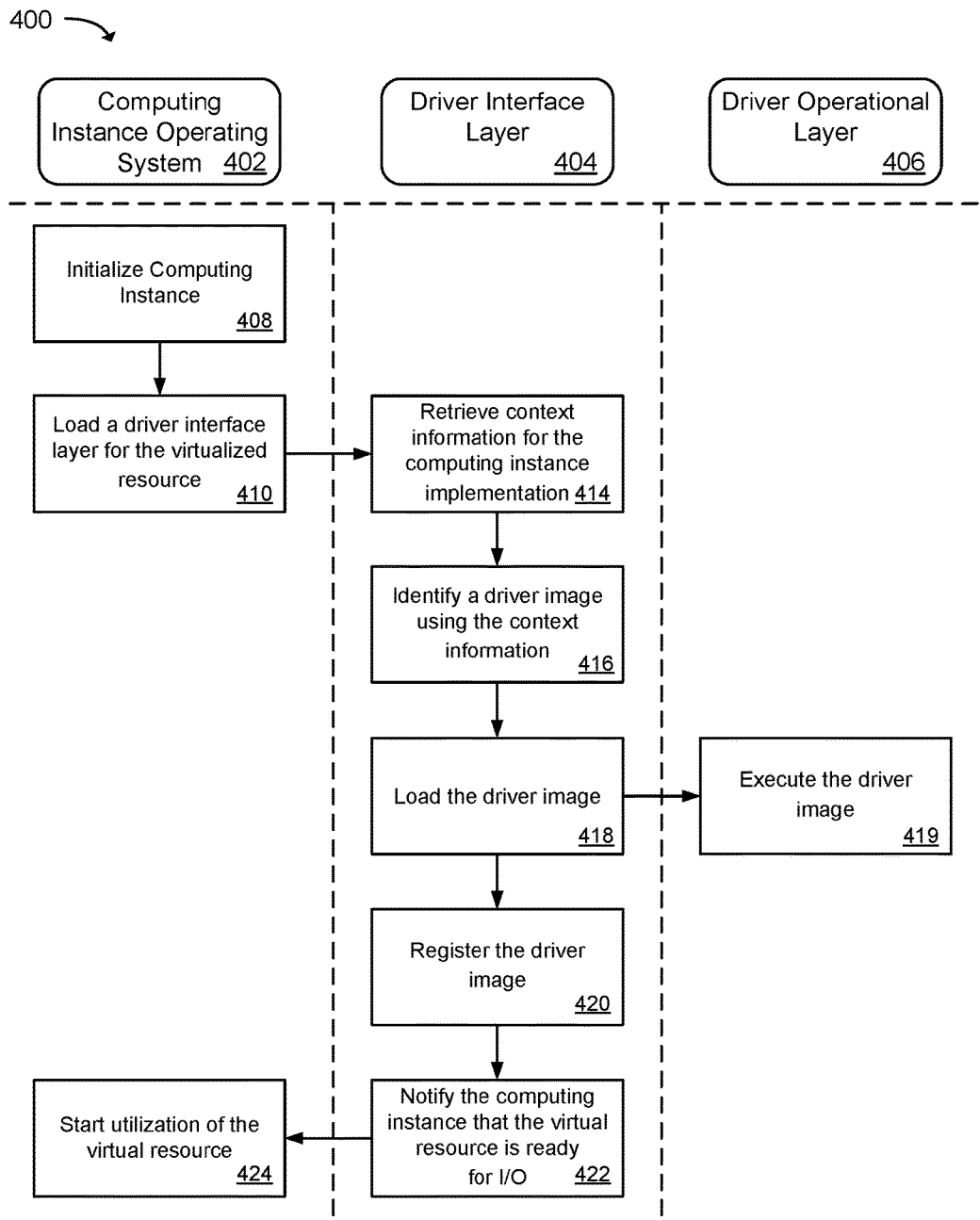
FIG. 4 is a flow diagram illustrating an example method for identifying and loading a version of driver image that provides driver functionality to a computing instance via a driver interface layer.

Moving now to FIG. 4, a block flow diagram illustrates an example method 400 for identifying and loading a driver image (e.g., a paravirtual driver) in a driver operational layer 406 that provides driver functionality to a computing instance via a driver interface layer 404. Starting in block 408, a computing instance may be launched in a computing service environment and a computing instance operating system 402 may be initialized. During initialization of the computing instance, a hypervisor may present the computing instance operating system 402 with a set of virtualized resources available for attachment to the computing instance. For example, a virtualized bus device (e.g., a XenBus) may be presented to the computing instance operating system 402 that includes virtualized resources such as a virtualized NIC adapter and a virtualized storage device. A virtualized resource presented to the computing instance operating system 402 at load time may include a virtualized resource identifier that may be used by the computing instance operating system 402 to identify a driver file, which when loaded, executes a driver interface layer 404 associated with the virtualized resource.

As in block 410, a driver interface layer 404 may be loaded with the computing instance. The driver interface layer 404 may interface with the driver operational layer 406 that provides driver functionality via a driver image loaded in the driver operational layer 406. The driver interface layer 404 may be configured to identify a driver image for the virtualized resource that corresponds to the computing instance implementation or other context information.

As in block 414, context information for the computing instance implementation (e.g., operating system type and version, physical host hardware specifications, hypervisor specifications, etc.) may be retrieved, and as in block 416, the context information may be used to identify a version of a driver image for the virtualized resource. As a specific example, context information for a computing instance implementation on a physical host may indicate that: the computing instance is executing WINDOWS SERVER 2012 version 6.2; that the hypervisor is CITRIX XENSERVER version 4.1.3; and that the physical host is configured with an INTEL XEON 3.3 GHz Processor. The context information may be used to request a driver version that is configured for: WINDOWS SERVER 2012 version 6.2; CITRIX XENSERVER version 4.1.3; and INTEL XEON 3.3 GHz Processor. In one example, the request may be made to the hypervisor which may use the context information to identify a version of a driver image that corresponds to the context information.

After identifying a driver image that corresponds to the computing instance implementation, the driver image may be loaded in the driver operational layer 406, as in block 418, where the driver image (i.e., driver code) may be executed, as in block 419. In some examples, as in block 420, the driver image may be registered with the driver interface layer 404, thereby allowing access to driver functionality provided by the driver image. In other examples, after loading the driver image using the driver operational layer 406, a reboot or partial reboot of the computing instance operating system 402 may be performed. During reboot of the computing instance operating system 402, the driver image loaded in the driver operational layer 406 may be recognized by the computing instance operating system 402.

As in block 422, after the driver image has been loaded, the computing instance operating system 402 may be notified that the virtual resource is ready for operation (e.g., I/O). For example, the driver interface layer 404 may notify the computing instance operating system 402 that a virtualized resource, such as a virtualized NIC adapter or a virtualized storage device is available to receive I/O. Upon being notified, as in block 424, the computing instance may start utilization of the virtual resource.

Figure 5:
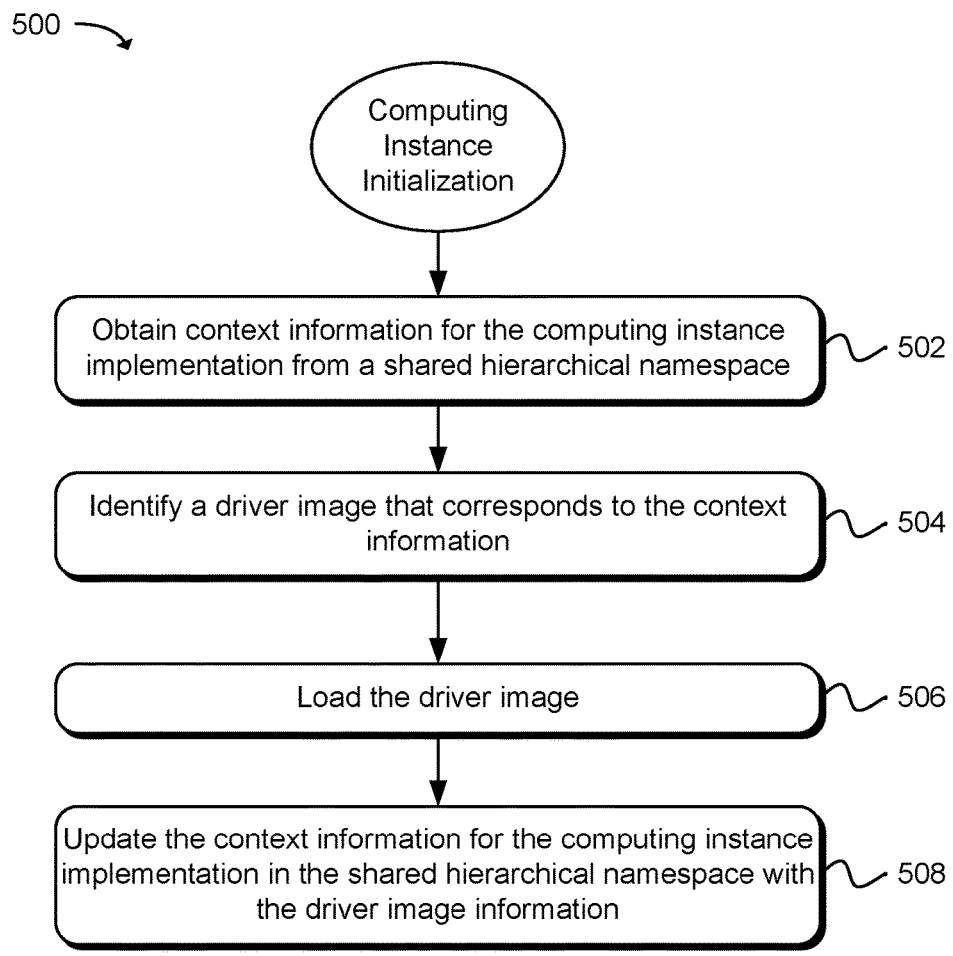
FIG. 5 is a flow diagram that illustrates an example method for obtaining context information used to identify a driver and update the context information with the driver image.

FIG. 5 is a flow diagram illustrating an example method 500 for obtaining context information used to identify a version of a driver image and update the context information to include the driver image loaded for a computing instance implementation. Starting in block 502, as part of a computing instance implementation, context information may be obtained from a shared hierarchical namespace (e.g., XenStore) that contains domain information for the computing instance. The shared hierarchical namespace may contain metadata associated with each computing instance managed by a hypervisor. The metadata contained in the shared hierarchical namespace may be accessible to a computing instance managed by the hypervisor. As such, the computing instance may obtain context information, such as an operating system type and version, from the shared hierarchical namespace.

As in block 504, a driver image that provides the operational layer of a driver that corresponds to the context information may be identified as described above in reference to FIG. 4, and as in block 506, the driver image may be loaded for use by the computing instance. Having identified the driver image and loaded the driver image, the context information for the computing instance implementation may be updated in the shared hierarchical namespace with the driver image information, as in block 508. As such, the context information for the computing instance implementation contained in the shared hierarchical namespace reflects the driver image utilized by the computing instance.

Figure 6:
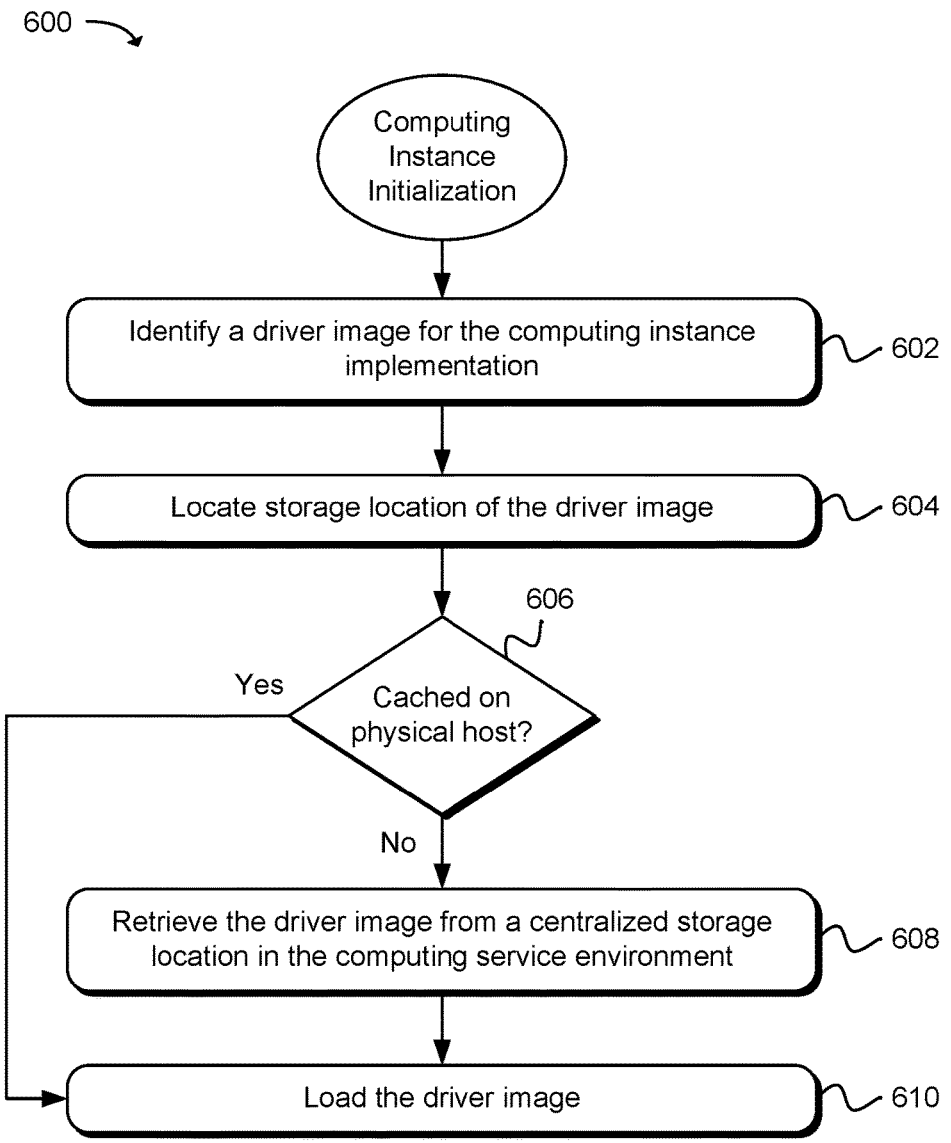
FIG. 6 is a flow diagram illustrating an example method for retrieving a driver image for use by a computing instance.

FIG. 6 is a flow diagram that illustrates an example method 600 for retrieving a version of a driver image for use by a computing instance. Starting in block 602, as part of a computing instance implementation, a driver image may be identified as described earlier. After identifying a driver image that corresponds to the computing instance implementation, as in block 604, a storage location of the driver image may be located.

In some examples, frequently used driver images may be cached on a physical host executing computing instances that utilize the driver images. Less frequently used driver images may be stored elsewhere, such as on a centralized storage location within a computing service environment that may be accessible to the physical hosts operating within the computing service environment. As in block 606, a determination whether the driver image may be cached on a physical host executing the computing instance may be made. In the case that the driver image is not cached on the physical host, as in block 608, the physical host executing the computing instance may retrieve the driver image via a driver retrieval interface from a centralized storage location in the computing service environment, or alternatively, the physical host may retrieve the driver image via the driver retrieval interface from a non-centralized or distributed storage location. In the case that the driver image is cached on the physical host, the driver image may be retrieved from the cache. After retrieving the driver image, as in block 610, the driver image may be loaded for use by the computing instance.

Figure 7:
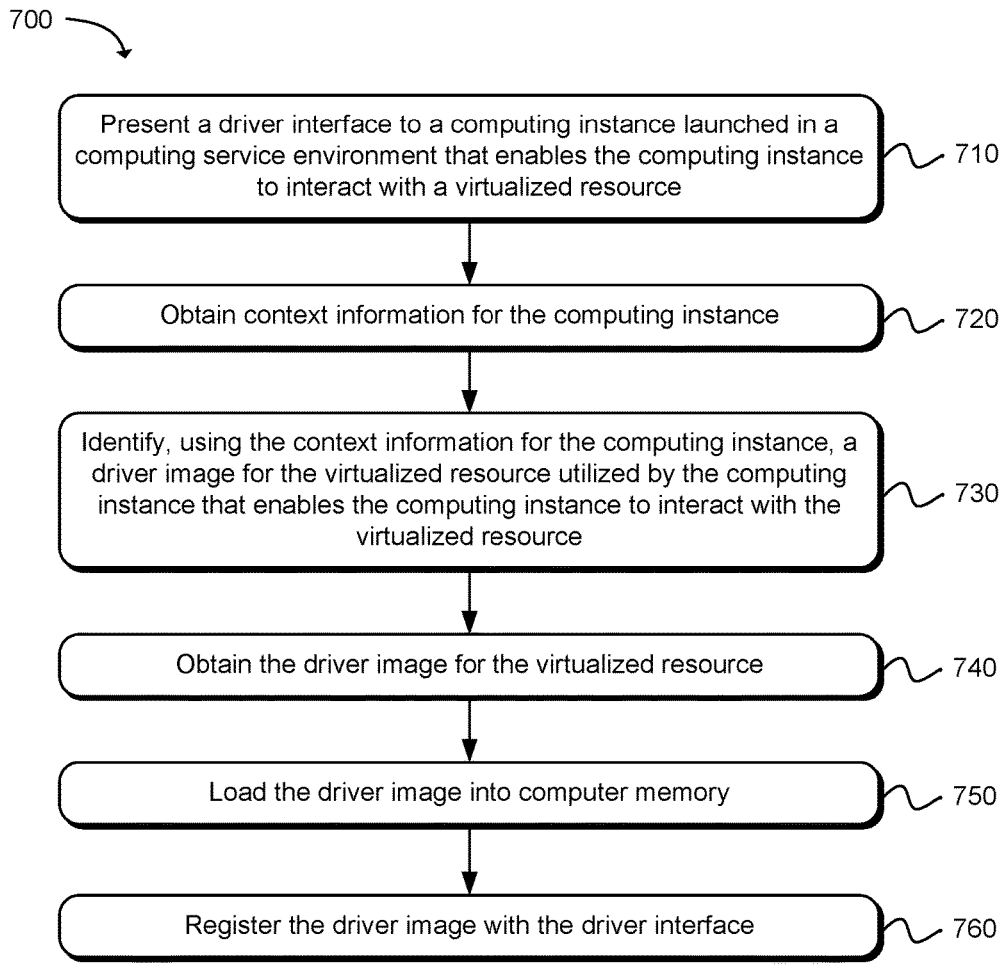
FIG. 7 is a flow diagram that illustrates an example method for load time updatable driver technology.

FIG. 7 is a flow diagram illustrating an example method 700 for load time updatable driver technology. Beginning in block 710, a driver interface may be presented to a computing instance launched in a computing service environment that enables the computing instance to interact with a virtualized resource. The driver interface may be an interface to driver functionality that enables the computing instance to interact with the virtualized resource via a hypervisor.

As in block 720, context information for the computing instance may be obtained. As in block 730, a driver image may be identified using the context information for the computing instance, where the driver image for the virtualized resource utilized by the computing instance enables the computing instance to interact with the virtualized resource. In one example, the driver interface may be configured with logic that submits the context information for the computing instance to the hypervisor that identifies the driver image using the context information.

As in block 740, the driver image for the virtualized resource may be obtained. In one example, the driver image may be obtained via a driver retrieval interface configured to locate and retrieve the driver image from a storage location. For example, the hypervisor may identify the driver image that corresponds to the computing instance and provide the retrieval interface the identity of driver image. The retrieval interface may then locate and retrieve the driver image.

As in block 750, the driver image may be loaded into computer memory. For example, the driver image may be loaded in a driver operational layer that interfaces with the driver interface. As in block 760, the driver image may be registered with the driver interface and the computing instance may be notified that the virtualized resource is ready for I/O.

Figure 8:
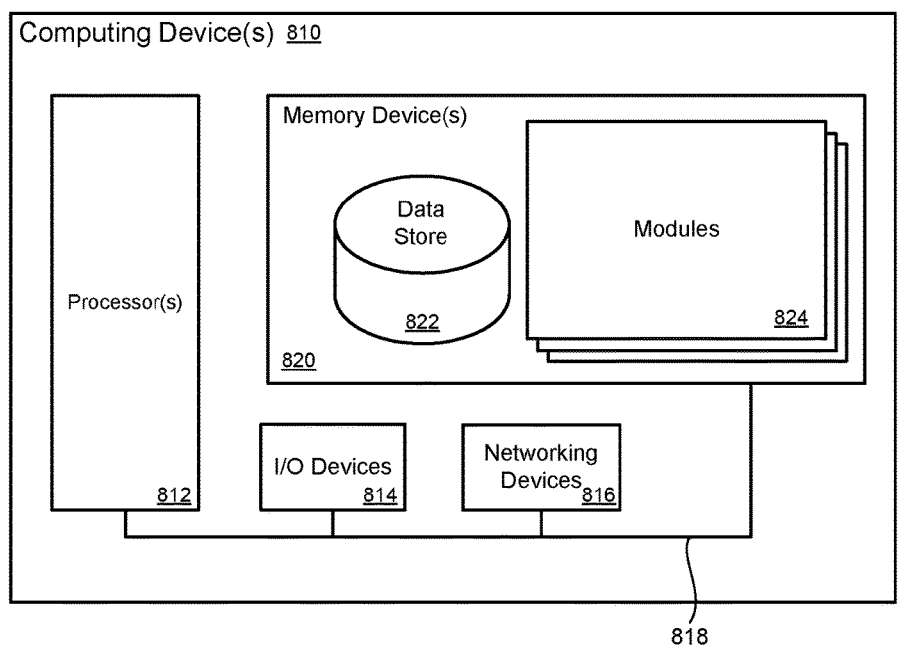
FIG. 8 is block diagram illustrating an example of a computing device that may be used to execute a method for identifying and loading updatable driver functionality on a computing instance launched on the computing device.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 that are executable by the processor(s) 812 and data for the modules 824. In one example, the memory device 820 may include driver interface layer that includes a driver selection module and a driver operational layer that includes a driver execution module. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media.

Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system comprising:
   at least one processor;
   a memory device including instructions that cause the system to:
   launch a computing instance in a computing service environment using a machine image;
   receive from a hypervisor virtualized resource information for a virtualized resource utilized by an operating system for the computing instance, wherein the virtualized resource emulates computer hardware utilized by the computing instance;
identify the virtualized resource associated with the virtualized resource information;
load a driver interface layer that accesses a driver operational layer that executes driver functionality enabling the operating system to interact with a virtualized resource;
present the driver interface layer to the operating system;
identify a driver image that is associated with hardware and software used to implement the computing instance, wherein the driver image provides functionality that permits the computing instance to interact with the virtualized resource via the hypervisor;
obtain the driver image for the virtualized resource;
load the driver image into the driver operational layer; and
register the driver image with the driver interface layer.

2. A system as in claim 1, wherein the memory device includes instructions that cause the system to notify the computing instance that the virtualized resource is operational.

3. A system as in claim 1, wherein the system further comprises a driver data store containing driver images for computing instances, wherein the driver image associated with the computing instance and the virtualized resource is obtained from the driver data store.

4. A computer implemented method, comprising:
loading a driver interface layer on a computing instance launched in a computing service environment, wherein the driver interface layer that enables the computing instance to interact with a virtualized resource and provides driver functionality to an operating system for the computing instance to interact with the virtualized resource via a hypervisor;
obtaining context information for the computing instance;
identifying, using the context information for the computing instance, a version of a driver image for the virtualized resource utilized by the operating system that enables the operating system to interact with the virtualized resource;
obtaining the driver image for the virtualized resource;
loading the driver image into computer memory; and
registering the driver image with the driver interface layer.

5. A method as in claim 4, further comprising receiving from the computing instance a virtualized resource identifier for the virtualized resource utilized by the computing instance.

6. A method as in claim 4, further comprising identifying an interface layer driver associated with a virtualized resource identifier for the virtualized resource utilized by the operating system, wherein loading the interface layer driver presents the driver interface layer to the operating system.

7. A method as in claim 4, further comprising updating driver information for the computing instance in a shared namespace containing domain information for computing instances managed by the hypervisor with information for the driver image.

8. A method as in claim 4, further comprising:
detecting that a machine image used to launch the computing instance includes an obsolete driver; and
updating the machine image to include an interface layer driver configured to allow the computing instance to access load time updatable driver functionality via the driver interface layer.

9. A method as in claim 4, wherein obtaining context information for the computing instance further comprises querying a shared namespace containing domain information for the computing instance for the context information.

10. A method as in claim 9, wherein the context information obtained from the shared namespace includes an operating system type for the computing instance.

11. A method as in claim 4, wherein obtaining the driver image for the virtualized resource further comprises obtaining the driver image via a driver retrieval interface configured to locate and retrieve the driver image from a storage location.

12. A method as in claim 4, wherein obtaining the driver image for the virtualized resource further comprises obtaining the driver image from a cached location in the hypervisor or from a centralized storage location in the computing service environment.

13. A method as in claim 4, further comprising:
removing a prior version of a driver image from computer memory; and
replacing the driver image cached in the computer memory.

14. A method as in claim 4, further comprising publishing new driver images to physical hosts included in the computing service environment that cache the new driver images in computer memory.

15. A method as in claim 4, further comprising publishing new driver images to a centralized data store included in the computing service environment that is accessible to physical hosts in the computing service environment.

16. A method as in claim 4, wherein the virtualized resource emulates network hardware or storage hardware utilized by the computing instance.

17. A method as in claim 4, wherein the driver interface layer submits the context information for the computing instance to the hypervisor that identifies the version of the driver image.

18. A computer implemented method, comprising:
loading a driver interface layer on a computing instance launched in a computing service environment to enable an operating system for the computing instance to interact with computer hardware via a hypervisor, wherein the driver interface layer is associated with paravirtual driver functionality that enables the operating system to interact with a virtualized resource via a hypervisor;
obtaining a version of paravirtual driver information for the virtualized resource utilized by the operating system that enables the operating system to interact with the virtualized resource;
loading the paravirtual driver information into computer memory; and
registering the paravirtual driver information with the driver interface layer.

19. A method as in claim 18, wherein presenting the driver interface layer to the operating system further comprises presenting a virtualized bus device configured to present a set of virtual resources to the operating system via a set of driver interfaces.

20. A method as in claim 18, further comprising querying a shared hierarchical namespace for metadata associated with the computing instance that provides an operating system type for the operating system of the computing instance.

* * * * *